J. HIRSCHENFELD.
HORSESHOE.
APPLICATION FILED SEPT. 5, 1919.
1,375,096.
Patented Apr. 19, 1921.
2 SHEETS—SHEET 1.
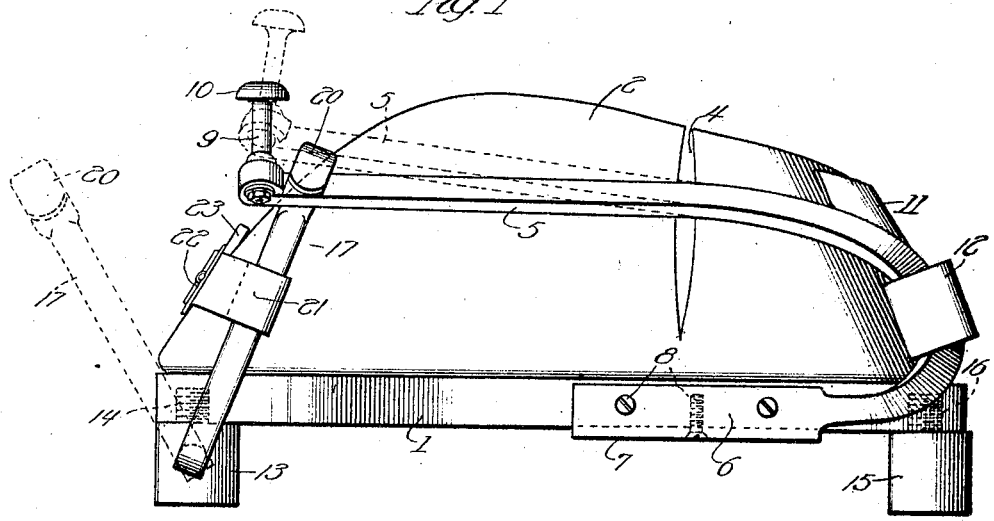
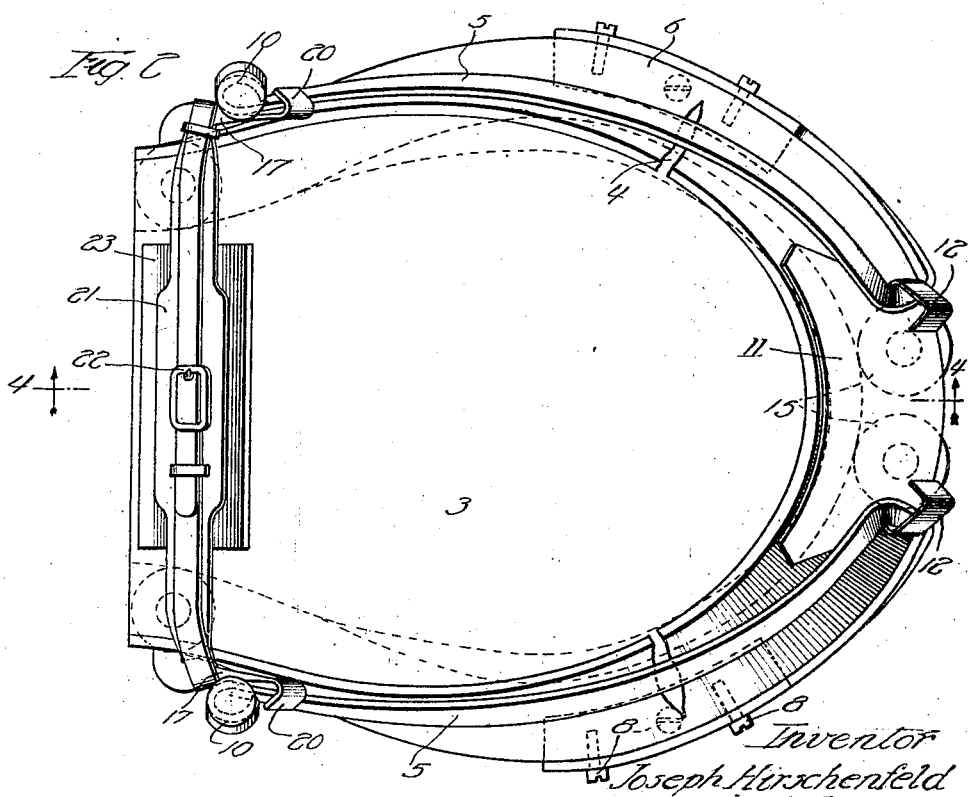
Inventor
Joseph Hirschenfeld

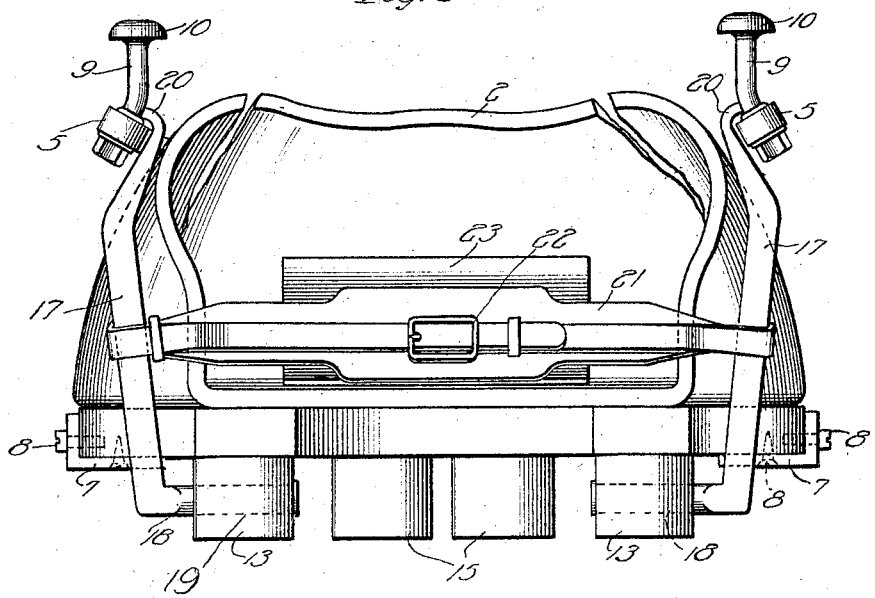
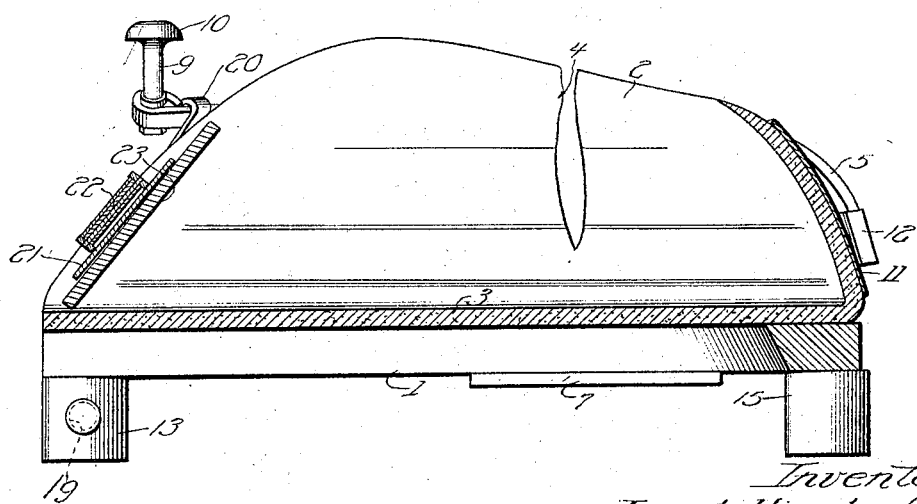

UNITED STATES PATENT OFFICE.

JOSEPH HIRSCHENFELD, OF OAK PARK, ILLINOIS.

HORSESHOE.

1,375,096.   Specification of Letters Patent.   Patented Apr. 19, 1921.

Application filed September 5, 1919. Serial No. 321,749.

*To all whom it may concern:*

Be it known that I, JOSEPH HIRSCHENFELD, a citizen of the United States, and a resident of Oak Park, in the county of Cook and State of Illinois, have invented certain new and useful Improvements in Horseshoes, of which the following is a specification.

This invention relates to horseshoes and more particularly to that type of horseshoe adapted to be attached to a horse's hoof by means other than the usual type of nails, namely, by employing fastening members adapted to permit the shoe to be attached or clamped to the horse's hoof.

The object of this invention is to provide a horseshoe of the character described embodying a novel form of fastening or clamping means designed to provide a shoe which may be easily attached to and removed from the horse's hoof, and one which may be properly fitted to the hoof and afford the maximum degree of comfort and freedom of movement of the horse's feet.

The novel features of my invention are hereinafter pointed out in detail, and fully illustrated in the accompanying drawings, wherein—

Figure 1 is a view in side elevation of a horseshoe embodying the features of my invention and showing the clamping members in closed and open position;

Fig. 2 is a top plan view of the horseshoe;

Fig. 3 is a view in rear elevation of the horseshoe showing the arrangement of the clamping and locking members; and Fig. 4 is a cross-sectional view of the horseshoe taken on line 4—4 of Fig. 2.

Referring to the drawings, a preferred form of the horseshoe embodying the features of my invention comprises in general a sole 1 formed of a suitable metal, such as wrought iron, and having a shape common to the ordinary type of horseshoe. Secured to the upper surface of the sole is an upper 2 preferably composed of a pliable material such as leather, rubber, or a composite material of cotton fabric impregnated with rubber. The upper 2 is shaped to conform with the horse's hoof and preferably comprises a bottom surface 3 which extends across the upper face of the sole and in contact therewith, there being provided suitable connecting means, such as rivets or like fastening members. If desired, the central portion of the bottom 3 of the upper 2 may be removed or cut out to expose the frog of the horse's hoof, there being retained a flange of the upper extending between the upper surface of the shoe and the horse's hoof. Extending upwardly and slightly inclined inwardly from the bottom 3 of the upper is the main portion of said upper, the same being of sufficient height to inclose the larger portion of the horse's hoof, the upper margin thereof tapering slightly toward its forward end and more abruptly downwardly in the direction of the heel, the rear portion of the upper being preferably removed to provide an opening through which the horse's hoof may be introduced. As shown in Figs. 1 and 2, there are provided on opposite sides of the upper 2 two transverse cuts or slits 4 extending downwardly from the upper margins, these cuts being provided for the purpose of permitting the upper to be spread during the operation of attaching the shoe to the horse's hoof.

Rigidly secured to the sole 1 are two yieldable clamping bars 5, 5, said bars being preferably joined to the sole and constructed in the following manner. The bars are provided at one end with an enlarged portion 6 which extends along and engages the outer surface of the sole along its side portions and adjacent to the toe thereof, said enlarged portion having along its lower margin an inwardly projecting flange 7 which extends beneath and bears against the bottom surface of said sole 1. A plurality of screws 8 extend through the portion 6 and flange 7 of the clamping bars and act to securely fasten said bars to the sole. From the point of connection with the sole, each of the bars extends in a forward direction toward the toe of the sole where they are curved upwardly in semi-circular form, and then extend rearwardly substantially parallel to the side portions of the sole and at some distance above said sole and below the upper margin of the upper 2. The clamping bars 5 terminate adjacent the heel of the sole 1 and at a distance above the heel, said free end of the clamping bars being provided with a vertical stem 9 which is surmounted by an enlarged head 10. These bars are preferably constructed of a metal having springlike qualities and capable of being moved inwardly and outwardly against the upper 2. At the forward or toe portion of the sole is provided a metal toe plate 11 which occupies the space between the semicircular portions of the clamping bars and extends from the sole to the margin of the upper and in contact with the latter. Said toe plate 11 is provided with ears 12, 12 which engage the adjacent portions of the clamping bars 5, 5 and act to maintain the toe plate in position.

At the rear extremities of the sole and forming the heel of the shoe are two depending lugs or calks 13, 13, said lugs being preferably cylindrical in shape and adapted to be detachably secured to the under surface of the metal sole by means of integral screw plugs 14 which engage openings tapped in the metal sole. In like manner there are provided similar detachable lugs or calks 15, 15 which are removably fastened to the toe of the metal sole by means of screw plugs 16, or in any other suitable manner. Mounted in each of the lugs 13, 13 constituting the heel of the shoe is a rotative or movable bar 17, said bar having a horizontally bent portion 18 which extends through a transverse opening 19 formed in the lugs 13, as shown in Figs. 3 and 4, said horizontally bent portion preferably extending from the outside of the sole and terminating beyond the inner surface of said lugs and secured in said openings 19, 19 by upsetting the ends or in some other suitable manner. The members 17 extend upwardly from the lugs 13, 13 and terminate adjacent to the free ends of the clamping bars 5, 5, there being provided at the ends of said locking bars 17, 17, suitable hooked extremities 20, 20 adapted to engage the adjacent free ends of the clamping bars 5, 5. As clearly shown in Fig. 1, the locking bars 17 are capable of being rotated forwardly and rearwardly in a vertical plane in the act of locking and unlocking the clamping bars in position, as will be hereinafter more fully described. Extending transversely between the locking bars 17, 17 is a retaining member or heel strap 21, said strap being preferably of leather or other soft and pliable material, constructed in such a manner that it may be easily removed from one or both of the locking bars 17. As illustrated, the heel strap 21 consists of a strap of double thickness having its ends outermost and connected together by a suitable buckle 22. To the inner portion of the strap is attached a pad 23, this strap together with its pad being adapted to engage the rear part of a horse's hoof and to aid in holding the shoe in place and to otherwise afford comfort and easy movement to the foot of the horse.

The shoe is applied to the horse's hoof by first unlocking the clamping bars 5 from the hooked extremities 20 of the locking bars 17 by pressing downwardly on the enlarged heads 10, 10 of the stems 9, 9 at the free ends of the clamping bars, thereby permitting said clamping bars to spread outwardly and away from the upper 2. The locking bars 17 are likewise swung rearwardly and downwardly to a position permitting the free access of the horse's hoof into the space within the shoe through the opening provided at the rear thereof. When the hoof is securely lodged within the shoe the clamping bars are pressed inwardly and downwardly and the locking bars moved forward into a position such that the clamping bars may be readily introduced into the hooked extremities of the said bars 17. The strap 21 may then be applied and the shoe is thus securely attached to the horse's hoof.

It is to be observed that a shoe constructed in this manner may be quickly and easily attached or removed from the horse's hoof, and by reason of the upper of a soft and pliable material, the shoe may be applied and worn without any discomfort to the horse.

Obviously the novel features of my invention may be variously modified without departing from the spirit of the invention, and therefore I do not wish to be limited to the preferred construction herein described and illustrated except in so far as I have specifically pointed out in the appended claims.

I claim as my invention:

1. A horseshoe comprising a metal sole, an upper of pliable material secured to said sole, yieldable clamping bars mounted on said sole and yieldingly embracing said upper, said sole being provided with detachable heel lugs, and locking bars mounted on said heel lugs and acting to detachably engage said clamping bars.

2. A horseshoe comprising a sole, an upper of pliable material adapted to inclose the front and side portions of a horse's hoof, clamping bars fixed to said sole and substantially embracing said upper, locking members for detachably engaging said clamping bars and mounted adjacent the heel portion of said sole, and a heel strap extending between said locking members.

In witness whereof, I hereunto subscribe my name this 26th day of August, A. D. 1919.

JOSEPH HIRSCHENFELD.